(12) United States Patent
Azrai et al.

(10) Patent No.: US 10,284,090 B2
(45) Date of Patent: May 7, 2019

(54) COMBINED BOOST CONVERTER AND POWER CONVERTER

(71) Applicant: Cirrus Logic International Semiconductor Ltd., Edinburgh (GB)

(72) Inventors: Firas Azrai, Austin, TX (US); Eric J. King, Austin, TX (US); Aaron J. Brennan, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 4 days.

(21) Appl. No.: 15/650,378

(22) Filed: Jul. 14, 2017

(65) Prior Publication Data

US 2018/0115246 A1 Apr. 26, 2018

Related U.S. Application Data

(60) Provisional application No. 62/410,657, filed on Oct. 20, 2016.

(51) Int. Cl.
*H02M 3/158* (2006.01)
*H02M 1/14* (2006.01)
(Continued)

(52) U.S. Cl.
CPC ............ *H02M 3/1582* (2013.01); *G06F 1/26* (2013.01); *H02J 7/0065* (2013.01);
(Continued)

(58) Field of Classification Search
CPC ...................... H02M 3/156; H02M 3/1582
(Continued)

(56) References Cited

U.S. PATENT DOCUMENTS 5,161,097 A * 11/1992 Ikeda ................... G05F 1/563
                                                          323/222
8,233,297 B2 * 7/2012 Kim ..................... H02M 3/155
                                                          315/247
(Continued)

FOREIGN PATENT DOCUMENTS

CN       105207256 A     12/2015
CN       205544932 U      8/2016
(Continued)

OTHER PUBLICATIONS

International Search Report and Written Opinion of the International Searching Authority, International Application No. PCT/US2017/057417, dated Jan. 19, 2018.
(Continued)

*Primary Examiner* — Gary A Nash
(74) *Attorney, Agent, or Firm* — Jackson Walker L.L.P.

(57) ABSTRACT

In accordance with embodiments of the present disclosure, a system may include a series combination of a boost converter and a power converter coupled together in series, such that the series combination boosts an input voltage to the series combination to an output voltage greater than the input voltage such that a voltage boost provided by the series combination is greater than a voltage boost provided by the boost converter alone. The system may also include an amplifier, wherein an input of the amplifier is coupled to an output of the series combination of the boost converter and the power converter.

18 Claims, 7 Drawing Sheets

(51) Int. Cl.
  *H02M 3/156* (2006.01)
  *H02M 3/335* (2006.01)
  *H02M 3/07* (2006.01)
  *G06F 1/26* (2006.01)
  *H02J 7/00* (2006.01)
  *H02M 1/00* (2006.01)

(52) U.S. Cl.
  CPC ............. *H02M 1/143* (2013.01); *H02M 3/07* (2013.01); *H02M 3/156* (2013.01); *H02M 3/158* (2013.01); *H02M 3/335* (2013.01); *H02M 2001/007* (2013.01)

(58) Field of Classification Search
  USPC ...... 323/223, 225, 226, 276; 363/50, 51, 60, 363/65, 124
  See application file for complete search history.

(56) References Cited

U.S. PATENT DOCUMENTS

| | | | |
|---|---|---|---|
| 2005/0265052 A1* | 12/2005 | Utsunomiya | H02M 3/073 363/60 |
| 2006/0006850 A1* | 1/2006 | Inoue | H02J 7/0065 323/265 |
| 2007/0097719 A1 | 5/2007 | Parramon et al. | |
| 2010/0289576 A1 | 11/2010 | Model | |
| 2010/0327765 A1 | 12/2010 | Melanson et al. | |
| 2011/0285375 A1* | 11/2011 | Deboy | G05F 1/67 323/299 |
| 2013/0070497 A1 | 3/2013 | Liquicia et al. | |
| 2013/0234513 A1 | 9/2013 | Bayer | |
| 2014/0104889 A1* | 4/2014 | Yamada | H02M 3/335 363/16 |
| 2014/0160031 A1 | 6/2014 | Schie | |
| 2014/0177299 A1* | 6/2014 | Wang | H02J 3/382 363/65 |
| 2014/0273897 A1 | 9/2014 | Drogi et al. | |
| 2015/0244257 A1* | 8/2015 | Dalwadi | H02M 1/14 323/234 |
| 2015/0346758 A1* | 12/2015 | Sakakibara | H02M 3/158 323/303 |

FOREIGN PATENT DOCUMENTS

| | | |
|---|---|---|
| EP | 2608377 A1 | 6/2013 |
| WO | 2014077587 A1 | 5/2014 |

OTHER PUBLICATIONS

Combined Search and Examination Report, UKIPO, Application No. GB1712741.6, dated Feb. 8, 2018.

* cited by examiner

FIG. 12

COMBINED BOOST CONVERTER AND POWER CONVERTER

RELATED APPLICATION

The present disclosure claims priority to U.S. Provisional Patent Application Ser. No. 62/410,657, filed Oct. 20, 2016, which is incorporated by reference herein in its entirety.

FIELD OF DISCLOSURE

The present disclosure relates in general to circuits for audio devices, including without limitation personal audio devices such as wireless telephones and media players, and more specifically, to a power converter capable of operating in a forced continuous conduction mode in order to achieve low power operation.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones or one or more speakers. Such circuitry often includes a speaker driver including a power amplifier for driving an audio output signal to headphones or speakers. Oftentimes, a power converter may be used to provide a supply voltage to a power amplifier in order to amplify a signal driven to speakers, headphones, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

Battery-powered systems may use a boost converter to generate a power supply for an audio amplifier that is greater than a voltage of the battery. For example, a motivation of using a boost converter in a battery-powered audio system is to generate a higher sound pressure level by allowing a greater signal swing at the output of an audio amplifier than could be achieved by powering the amplifier directly from the battery. However, using a boost converter to achieve a boosted voltage may be problematic in portable electronics applications due to the physical size of an inductor required to provide such boost which may render implementing a boost converter with a single stage to be an unattractive option.

SUMMARY

In accordance with the teachings of the present disclosure, one or more disadvantages and problems associated with existing approaches to boosting a voltage may be reduced or eliminated.

In accordance with embodiments of the present disclosure, a system may include a series combination of a boost converter and a power converter coupled together in series, such that the series combination boosts an input voltage to the series combination to an output voltage greater than the input voltage such that a voltage boost provided by the series combination is greater than a voltage boost provided by the boost converter alone. The system may also include an amplifier, wherein an input of the amplifier is coupled to an output of the series combination of the boost converter and the power converter.

In accordance with these and other embodiments of the present disclosure, a method may include coupling a series combination of a boost converter and a power converter together in series, such that the series combination boosts an input voltage to the series combination to an output voltage greater than the input voltage such that a voltage boost provided by the series combination is greater than a voltage boost provided by the boost converter alone. The method may also include coupling an input of an amplifier to an output of the series combination of the boost converter and the power converter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
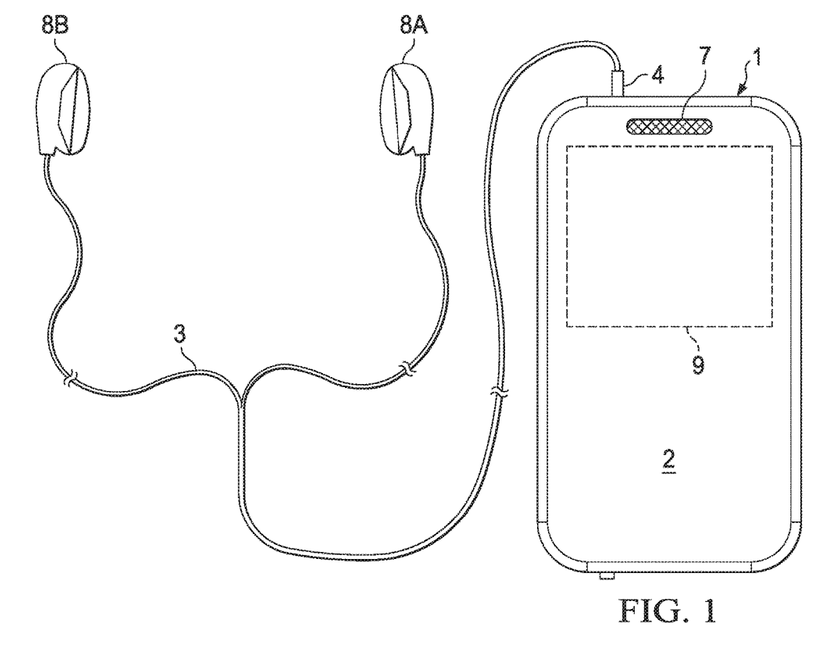
FIG. 1 illustrates an example personal audio device, in accordance with embodiments of the present disclosure.

FIG. 1 illustrates an example personal audio device 1, in accordance with embodiments of the present disclosure. FIG. 1 depicts personal audio device 1 having a speaker 7. Speaker 7 is merely an example, and it is understood that personal audio device 1 may be used in connection with a variety of audio transducers including magnetic coil loudspeakers, piezo speakers, and others. In addition or alternatively, personal audio device 1 may be coupled to a headset 3 in the form of a pair of earbud speakers 8A and 8B. Headset 3 depicted in FIG. 1 is merely an example, and it is understood that personal audio device 1 may be used in connection with a variety of audio transducers, including without limitation, headphones, earbuds, in-ear earphones, and external speakers. A plug 4 may provide for connection of headset 3 to an electrical terminal of personal audio device 1. Personal audio device 1 may provide a display to a user and receive user input using a touch screen 2, or alternatively, a standard liquid crystal display (LCD) may be combined with various buttons, sliders, and/or dials disposed on the face and/or sides of personal audio device 1. As also shown in FIG. 1, personal audio device 1 may include an audio integrated circuit (IC) 9 for generating an analog audio signal for transmission to speaker 7, headset 3, and/or another audio transducer.

Figure 2:
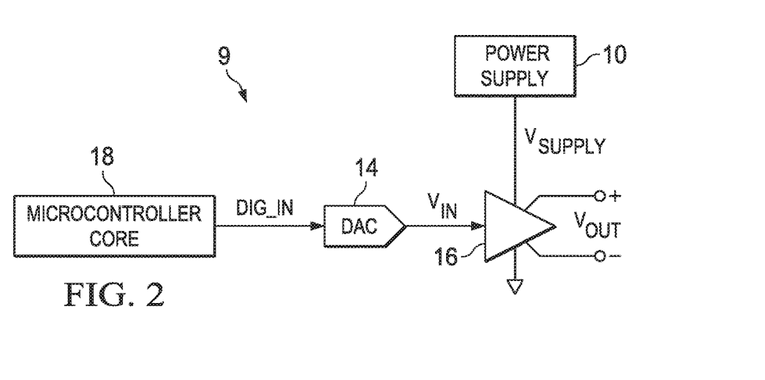
FIG. 2 illustrates a block diagram of selected components of an example audio integrated circuit of a personal audio device, in accordance with embodiments of the present disclosure.

FIG. 2 illustrates a block diagram of selected components of an example audio IC 9 of a personal audio device, in accordance with embodiments of the present disclosure. As shown in FIG. 2, a microcontroller core 18 may supply a digital audio input signal DIG_IN to a digital-to-analog converter (DAC) 14, which may convert the digital audio input signal to an analog signal $V_{IN}$. DAC 14 may supply analog signal $V_{IN}$ to an amplifier 16 which may amplify or attenuate audio input signal $V_{IN}$ to provide a differential audio output signal $V_{OUT}$, which may operate a speaker, a headphone transducer, a line level signal output, and/or other suitable output. In some embodiments, DAC 14 may be an integral component of amplifier 16. A power supply 10 may provide the power supply rail inputs of amplifier 16. In some embodiments, power supply 10 may comprise a switched-mode power converter, as described in greater detail below. Although FIGS. 1 and 2 contemplate that audio IC 9 resides in a personal audio device, systems and methods described herein may also be applied to electrical and electronic systems and devices other than a personal audio device, including audio systems for use in a computing device larger than a personal audio device, an automobile, a building, or other structure.

Figure 3:
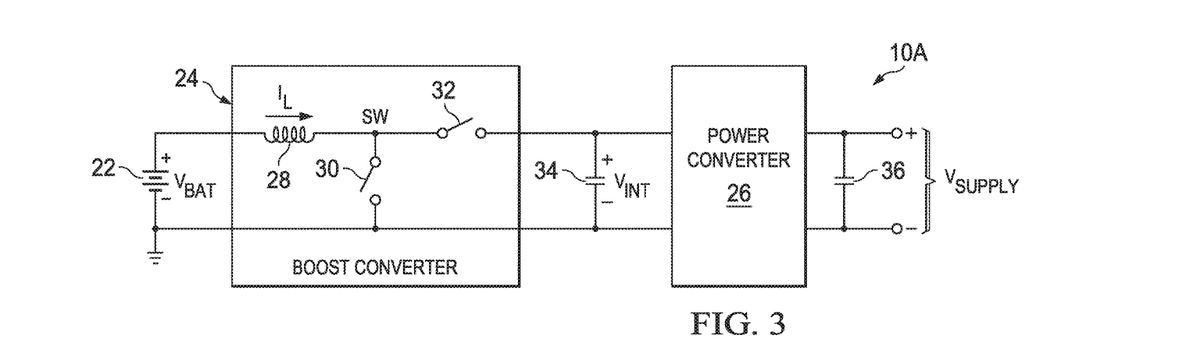
FIG. 3 illustrates a block diagram of selected components of an example subsystem which may be used to implement the power supply shown in FIG. 2, in accordance with embodiments of the present disclosure.

FIG. 3 illustrates a block diagram of selected components of an example subsystem 10A which may be used to implement power supply 10 shown in FIG. 2, in accordance with embodiments of the present disclosure. As shown in FIG. 3, subsystem 10A may include a battery 22, a boost converter 24, a power converter 26 coupled in series with boost converter 24, a capacitor 34 coupled between boost converter 24 and power converter 26, and a capacitor 36 coupled between output terminals of power converter 36. Although subsystem 10A is shown having capacitors 34 and 36, in some embodiments, one or both of capacitors 34 and 36 may be replaced by a respective energy storage device configured to store electrical charge.

As shown in FIG. 3, boost converter 24 may include a power inductor 28, a switch 30, and a switch 32. In some embodiments, one or both of switch 30 and switch 32 may be implemented as field-effect transistors (FETs). In a first phase of a switching cycle of boost converter 24, a suitable controller may cause switch 30 to be activated (e.g., closed, turned on, enabled) and switch 32 to be deactivated (e.g., opened, turned off, disabled). Thus, during such first phase (Phase A), a switch node (labeled as "SW" in FIG. 3) may be shorted to a ground potential, such that battery 22 applies its voltage $V_{BAT}$ across terminals of power inductor 28. As a result, an inductor current $I_L$ flowing in power inductor 28 may increase during the first phase. In a second phase of the switching cycle of boost converter 24, a suitable controller may cause switch 30 to be deactivated and switch 32 to be activated. As a result, inductor current $I_L$ may decrease during such second phase as power inductor 28 discharges into capacitor 34, boosting an intermediate voltage $V_{INT}$ to a voltage higher than battery voltage $V_{BAT}$. In order to control switches 30 and 32, a suitable controller may output one or more pulse-width modulated control signals to switches 30 and 32 to control their respective duty cycles. In operation, duty cycles of switches 30 and 32 (e.g., the duration of the first phase) may determine the magnitude of intermediate voltage $V_{INT}$ relative to battery voltage $V_{BAT}$. Thus, for a desired level of intermediate voltage $V_{INT}$ (e.g., which may be based on a desired supply voltage $V_{SUPPLY}$), a suitable controller may implement a feedback control loop to achieve desired intermediate voltage $V_{INT}$ and/or desired supply voltage $V_{SUPPLY}$.

Figure 4:
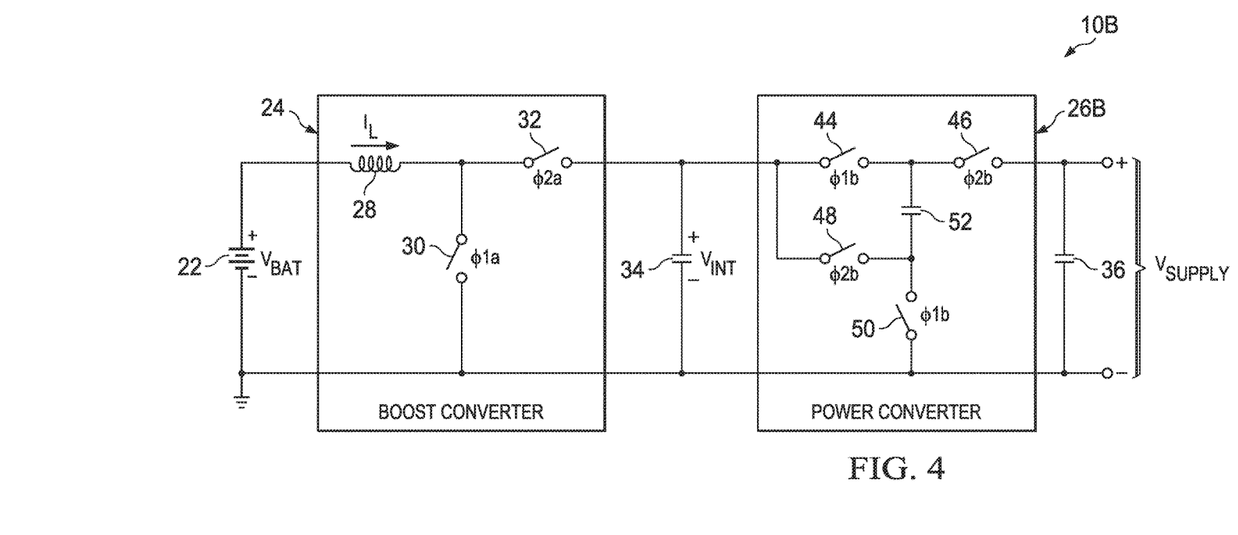
FIG. 4 illustrates a block diagram of selected components of an example subsystem which may be used to implement the power supply shown in FIG. 2 wherein the power converter of FIG. 3 is implemented as a charge pump, in accordance with embodiments of the present disclosure.
Figure 6:
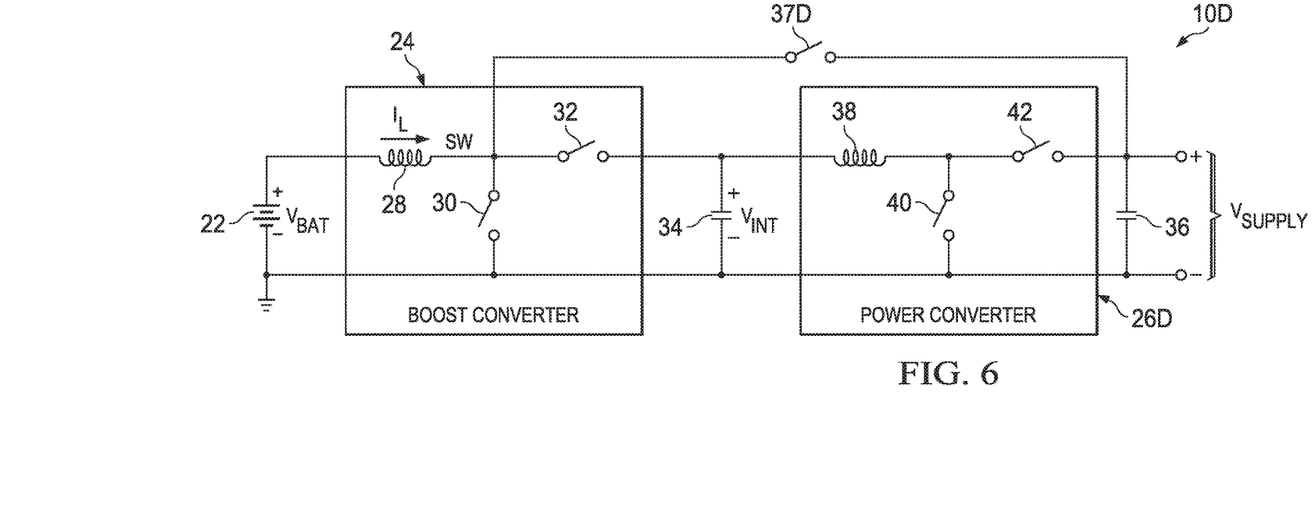
FIG. 6 illustrates a block diagram of selected components of another example subsystem which may be used to implement the power supply shown in FIG. 2 wherein a bypass switch is employed to selectively bypass operation of a boost converter and a second boost converter coupled in series with the boost converter, in accordance with embodiments of the present disclosure.

Furthermore, in operation, power converter 26 may output supply voltage $V_{SUPPLY}$ to a voltage higher than intermediate voltage $V_{INT}$. To further boost intermediate voltage $V_{INT}$ into supply voltage $V_{SUPPLY}$, power converter 26 may include a charge pump (e.g., as shown in FIG. 4), another boost converter (e.g., as shown in FIG. 6), or any other suitable power converter. Thus, the additional boost provided by power converter 26 may allow for smaller devices to be used within boost converter 24, thus minimizing circuit size.

FIG. 4 illustrates a block diagram of selected components of an example subsystem 10B which may be used to implement subsystem 10A of FIG. 3 wherein power converter 26 of FIG. 3 is implemented as power converter 26B including a charge pump, in accordance with embodiments of the present disclosure. As shown in FIG. 4, to implement a charge pump, power converter 26B may include a plurality of switches 44, 46, 48, and 50, and a flyback capacitor 52, arranged as shown in FIG. 4. Thus, in some embodiments, power converter 26B may implement a charge pump doubler that doubles intermediate voltage $V_{INT}$ to generate supply voltage $V_{SUPPLY}$. Because charge pumps are well-known in the art, a detailed description of the operation of power converter 26B is not set forth herein.

Thus, the presence of capacitor 34 may provide isolation between boost converter 24 and power converter 26B to allow phases of boost converter 24 and power converter 26B to be optimized independently from each other. In addition, capacitor 34 may provide energy storage that may be used by power converter 26B or other successive power converters without increasing a peak power drawn from the supply. Thus, subsystem 10A and 10B may provide a degree of freedom for a circuit or system designer to trade inductors for capacitors in order to reduce physical size of a boost circuit.

Figure 5:
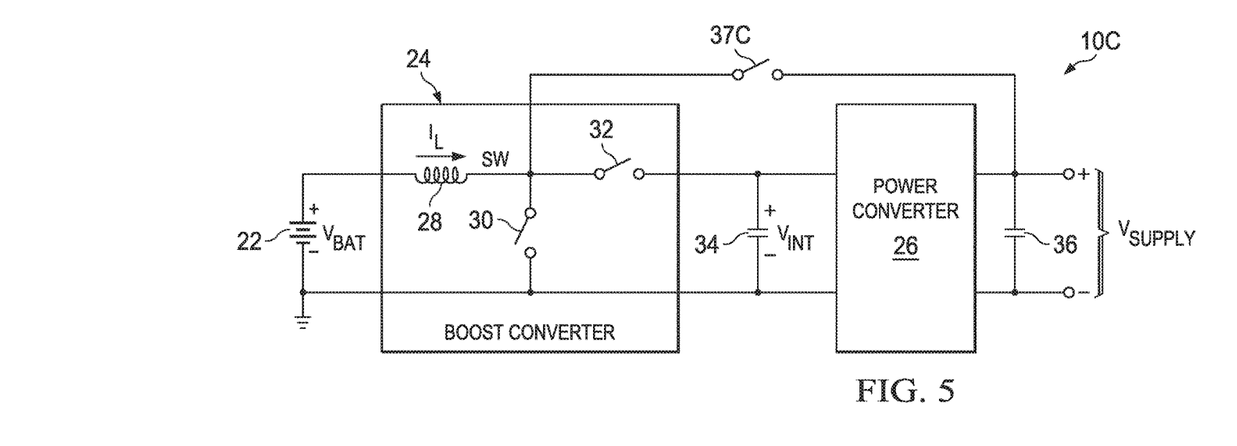
FIG. 5 illustrates a block diagram of selected components of another example subsystem which may be used to implement the power supply shown in FIG. 2 wherein a bypass switch is employed to selectively bypass operation of a boost converter and a power converter, in accordance with embodiments of the present disclosure.

In some embodiments, a subsystem similar to that of subsystem 10A may include switches or other components to enable bypassing of particular portions of the subsystem. For example, FIG. 5 illustrates a block diagram of selected components of an example subsystem 10C which may be used to implement subsystem 10A of FIG. 3 wherein a bypass switch 37C may be coupled between switching node SW of boost converter 24 and the output of power converter 26, thus allowing for, when switch 37C is enabled, bypass of operation of boost converter 24 and power converter 26 such that supply voltage $V_{SUPPLY}$ is equivalent to battery voltage $V_{BAT}$. As another example, FIG. 6 illustrates a block diagram of selected components of an example subsystem 10D which is similar in many material respects to subsystem 10C of FIG. 5, with the exception that power converter 26 is implemented as a power converter 26D having a second boost converter comprising power inductor 38 and switches 40 and 42 and a bypass switch 37D is coupled between switching node SW of boost converter 24 and the output of power converter 26D.

Figure 7:
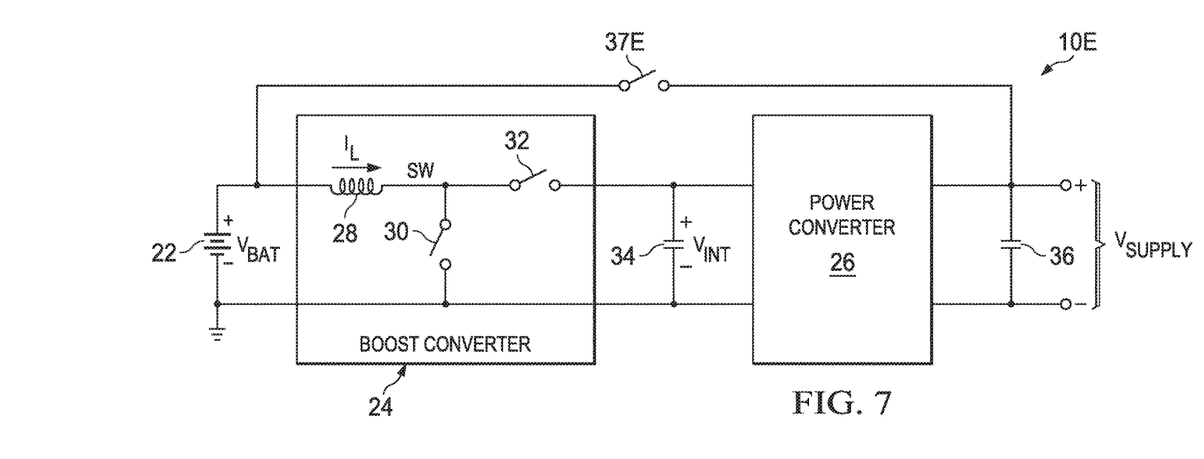
FIG. 7 illustrates a block diagram of selected components of another example subsystem which may be used to implement the power supply shown in FIG. 2, in accordance with embodiments of the present disclosure.

As a further example, FIG. 7 illustrates a block diagram of selected components of an example subsystem 10E which may be used to implement subsystem 10A of FIG. 3 wherein a bypass switch 37E may be coupled between battery 22 and the output of power converter 26, thus allowing for, when switch 37E is enabled, bypass of operation of boost converter 24 and power converter 26 such that supply voltage $V_{SUPPLY}$ is equivalent to battery voltage $V_{BAT}$.

Figure 8:
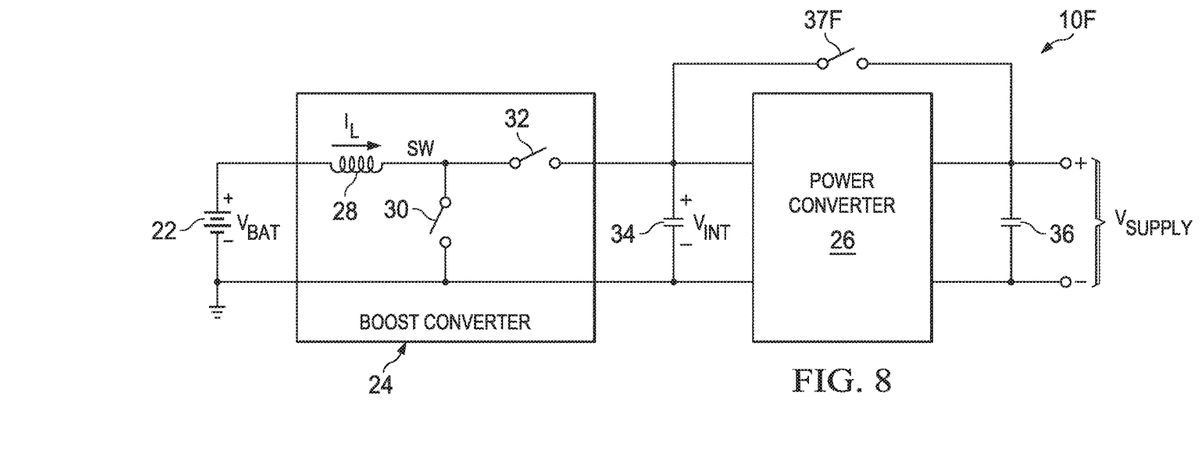
FIG. 8 illustrates a block diagram of selected components of another example subsystem which may be used to implement the power supply shown in FIG. 2, in accordance with embodiments of the present disclosure.

As yet another example, FIG. 8 illustrates a block diagram of selected components of an example subsystem 10F which may be used to implement subsystem 10A of FIG. 3 wherein a bypass switch 37F may be coupled between capacitor 34 and the output of power converter 26, thus allowing for, when switch 37F is enabled, bypass of operation of power converter 26 such that supply voltage $V_{SUPPLY}$ is equivalent to intermediate voltage $V_{INT}$.

Figure 9:
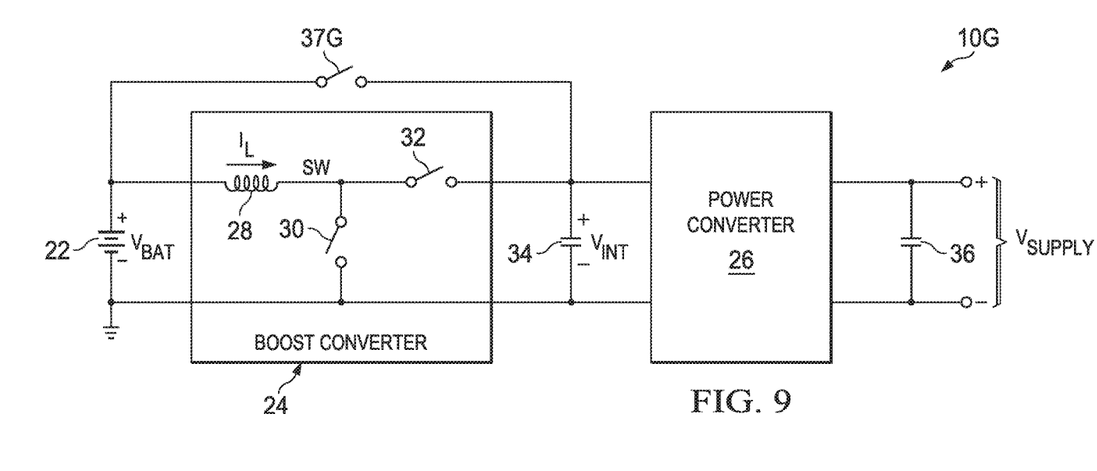
FIG. 9 illustrates a block diagram of selected components of another example subsystem which may be used to implement the power supply shown in FIG. 2, in accordance with embodiments of the present disclosure.

As yet another example, FIG. 9 illustrates a block diagram of selected components of an example subsystem 10G which may be used to implement subsystem 10A of FIG. 3 wherein a bypass switch 37G may be coupled between battery 22 and capacitor 34, thus allowing for, when switch 37G is enabled, bypass of operation of boost converter 24 such that supply voltage $V_{SUPPLY}$ is equivalent to two times battery voltage $V_{BAT}$ assuming power converter 26 operates as a charge pump doubler.

In some embodiments, multiple bypass switches may be present, allowing for operation in a plurality of bypass modes. For example, in embodiments including both bypass switch 37F and bypass switch 37G, the bypass modes set forth in the following table may be possible in order to enable operation of amplifier 16 as a Class-G or Class-H amplifier (assumes power converter 26 operates as a charge pump doubler):

| Mode | $V_{SUPPLY}$ = | Configuration |
|---|---|---|
| 1 | $V_{BAT}$ | Boost converter 24 bypassed Power converter 26 bypassed |
| 2 | $V_{INT}$ | Boost converter 24 enabled Power converter 26 bypassed |
| 3 | $2 \times V_{INT}$ | Boost converter 24 enabled Power converter 26 enabled |
| 4 | $2 \times V_{BAT}$ | Boost converter 24 disabled Power converter 26 enabled |

In addition, systems and methods similar to those described herein may be used to implement a distributed architecture of a subsystem having a single boost converter 24 which is followed in series by a plurality of parallel power converters 26, wherein each power converter 26 supplies power to a respective amplifier 16.

Figure 10:
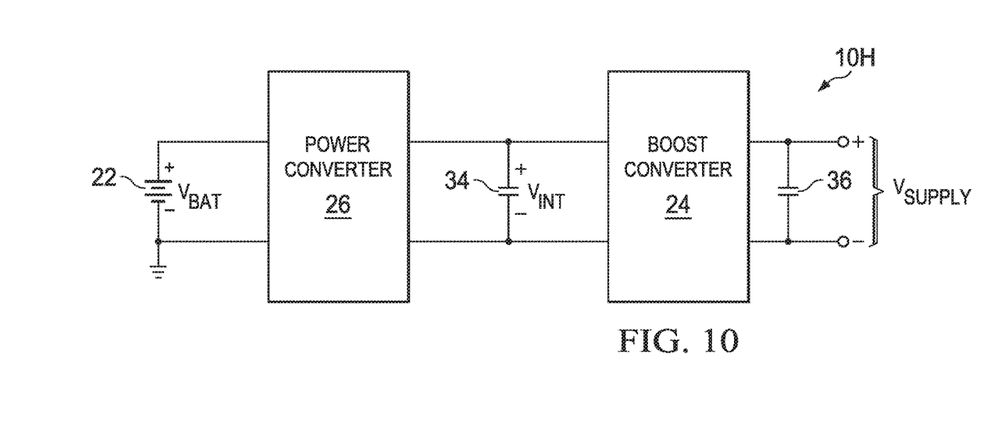
FIG. 10 illustrates a block diagram of selected components of another example subsystem which may be used to implement the power supply shown in FIG. 2, in accordance with embodiments of the present disclosure.

Furthermore, although the foregoing contemplates a boost converter 24 "followed" by a power converter 26 such that power converter 26 receives and operates on an output of boost converter 24, in some embodiments, power converter 26 may "follow" boost converter 24 such that power converter 26 receives and operates on battery voltage $V_{BAT}$ and boost converter 24 receives and operates on an output of power converter 26, as shown in example subsystem 10H of FIG. 10.

Figure 11:
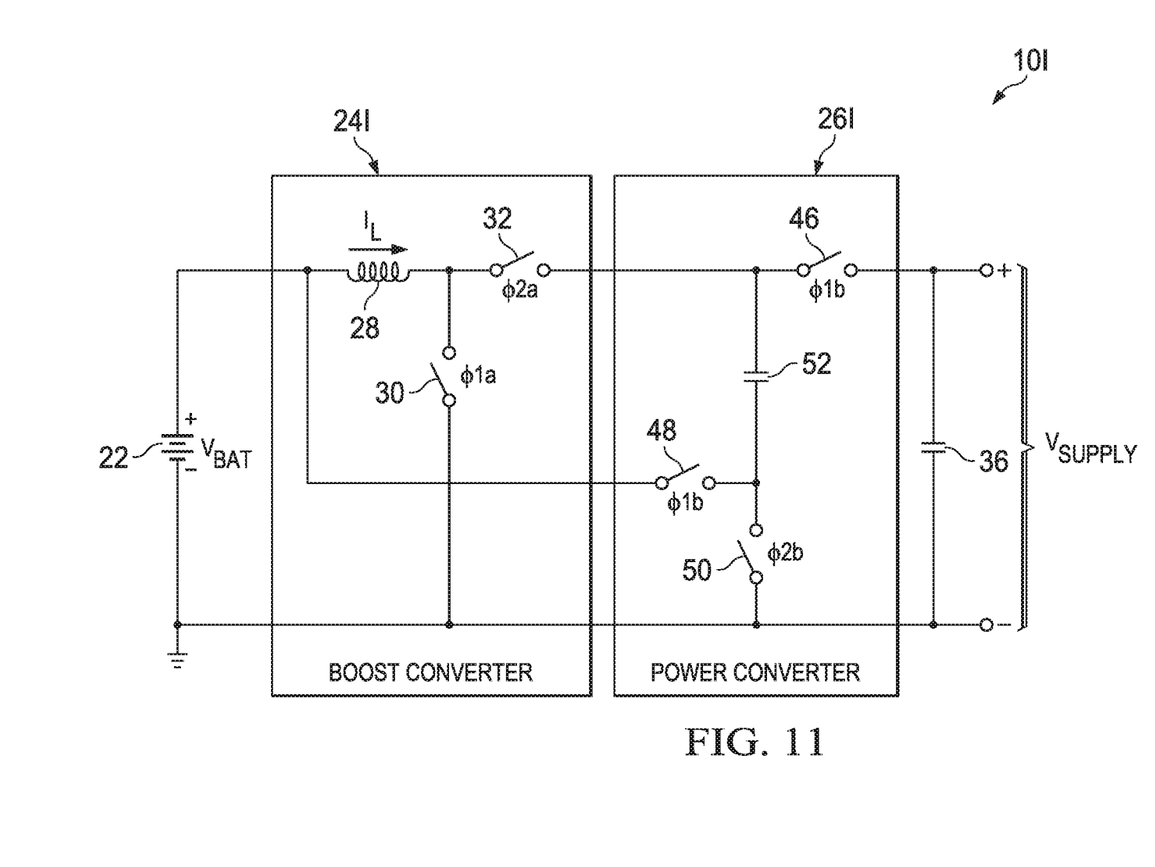
FIG. 11 illustrates a block diagram of selected components of another example subsystem which may be used to implement the power supply shown in FIG. 2, in accordance with embodiments of the present disclosure.
Figure 12:
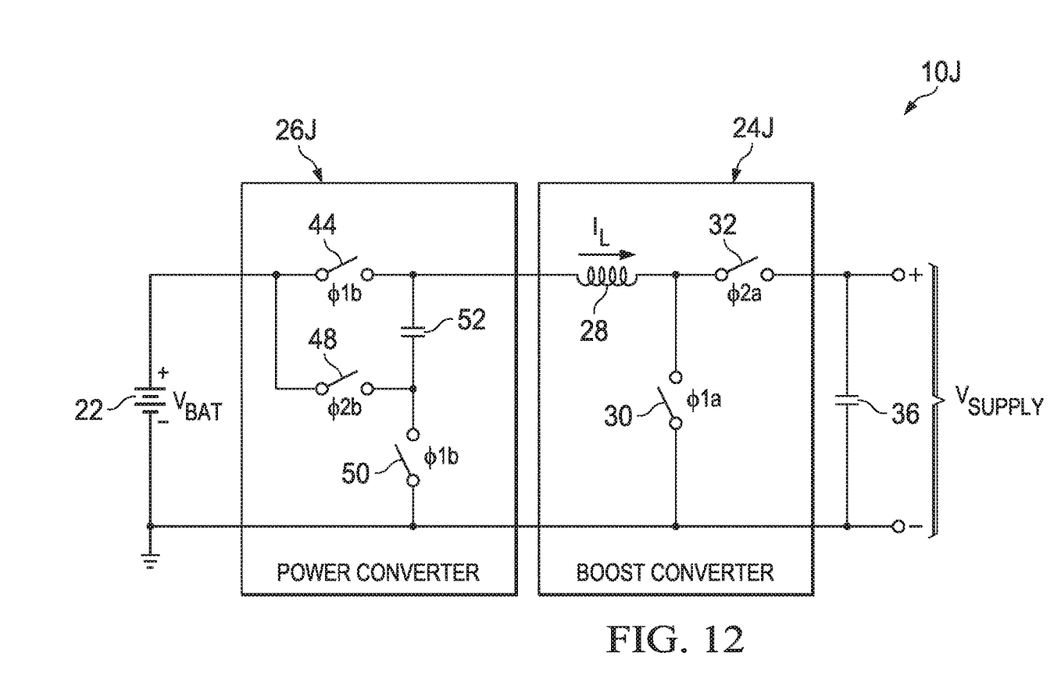
FIG. 12 illustrates a block diagram of selected components of another example subsystem which may be used to implement the power supply shown in FIG. 2, in accordance with embodiments of the present disclosure.

In some applications, a system designer may have freedom to remove intermediate capacitor 34 in order to integrate operation of boost converter 24 and power converter 26. For example, FIG. 11 illustrates a block diagram of selected components of an example subsystem 10I which may be used to implement subsystem 10A of FIG. 3 wherein a boost converter 24I and a power converter 26I may be integrated and coupled in series without a capacitor 34 intermediate to boost converter 24I and power converter 26I. Similarly, FIG. 12 illustrates a block diagram of selected components of an example subsystem 10J which may be used to implement subsystem 10A of FIG. 3 wherein a power converter 26J and a boost converter 24J may be integrated and coupled in series without a capacitor 34 intermediate to power converter 26J and boost converter 24J. Advantages in such approaches may include fewer switches and external capacitors. Disadvantages may include increase complexity of phase control and higher peak current from battery 22 while both the boost converter and power converter are charging.

Advantageously, the series combination of a boost converter and power converter as described herein may enable reduced size of boost inductors required to provide an adequate level of boost in electronic systems. For instance, where a charge pump doubler is used as the power converter, the boost inductor size may be half of that required to achieve the same level of voltage boost with a single-stage boost converter.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A system comprising:
   a series combination of a boost converter and a power converter coupled together in series, such that the series combination is configured to boost an input voltage supplied at an input of the series combination to an output voltage greater than the input voltage such that a voltage boost provided by the series combination is greater than a voltage boost provided by the boost converter alone, wherein the power converter includes a capacitor, wherein a terminal of the capacitor is coupled via a first switch to the input of the series combination, and wherein the terminal of the capacitor is further coupled via a second switch to a ground terminal; and
   an audio amplifier, wherein an input of the audio amplifier is coupled to an output of the series combination of the boost converter and the power converter such that the series combination is configured to provide electrical energy to power the audio amplifier.

2. The system of claim 1, wherein the power converter comprises a charge pump.

3. The system of claim 1, wherein the power converter comprises a second boost converter.

4. The system of claim 1, further comprising a bypass switch configured to selectively bypass the power converter in usage based on a desired output voltage of the series combination of the boost converter and the power converter.

5. The system of claim 1, further comprising a bypass switch configured to selectively bypass the boost converter and the power converter in usage based on a desired output voltage of the series combination of the boost converter and the power converter.

6. The system of claim 5, wherein the bypass switch, when enabled, is configured to bypass a power inductor and switches of the boost converter in usage.

7. The system of claim 5, wherein the bypass switch, when enabled, is configured to bypass switches of the boost converter in usage while leaving a power inductor of the boost converter in usage.

8. The system of claim 1, further comprising an energy storage device coupled between the boost converter and the power converter and configured to receive electrical energy from one of the boost converter and the power converter and deliver the electrical energy to the other of the boost converter and the power converter.

9. The system of claim 1, wherein the ground terminal is a ground reference of both the input voltage and the output voltage.

10. The system of claim 1, wherein the capacitor is a flyback capacitor of the power converter.

11. A method comprising:
    coupling a series combination of a boost converter and a power converter together in series, such that the series combination boosts an input voltage supplied at an input of the series combination to an output voltage greater than the input voltage such that a voltage boost provided by the series combination is greater than a voltage boost provided by the boost converter alone, wherein the power converter includes a capacitor, wherein a terminal of the capacitor is coupled via a first switch to the input of the series combination, and wherein the terminal of the capacitor is further coupled via a second switch to a ground terminal; and
    coupling an input of an audio amplifier to an output of the series combination of the boost converter and the power converter such that the series combination is configured to provide electrical energy to power the audio amplifier.

12. The method of claim 11, wherein the power converter comprises a charge pump.

13. The method of claim 11, wherein the power converter comprises a second boost converter.

14. The method of claim 11, further comprising coupling a bypass switch to the boost converter and the power converter such that the bypass switch is usable to selectively bypass the power converter in usage based on a desired output voltage of the series combination of the boost converter and the power converter.

15. The method of claim 11, further comprising coupling a bypass switch to the boost converter and the power converter such that the bypass switch is usable to selectively bypass the boost converter and the power converter in usage based on a desired output voltage of the series combination of the boost converter and the power converter.

16. The method of claim 15, wherein the bypass switch, when enabled, bypasses a power inductor and switches of the boost converter in usage.

17. The method of claim 15, wherein the bypass switch, when enabled, bypasses switches of the boost converter in usage while leaving a power inductor of the boost converter in usage.

18. The method of claim 11, further comprising coupling an energy storage device between the boost converter and the power converter such that the energy storage device is configured to receive electrical energy from one of the boost converter and the power converter and deliver the electrical energy to the other of the boost converter and the power converter.

* * * * *

UNITED STATES PATENT AND TRADEMARK OFFICE
CERTIFICATE OF CORRECTION

PATENT NO. : 10,284,090 B2
APPLICATION NO. : 15/650378
DATED : May 7, 2019
INVENTOR(S) : Azrai et al.

Page 1 of 1

It is certified that error appears in the above-identified patent and that said Letters Patent is hereby corrected as shown below:

In the Specification

Column 4, Line 12, delete "power converter 36." and insert -- power converter 26. --, therefor.

Column 6, Line 33, delete "boost converter 241 and a power converter 261" and insert -- boost converter 24I and a power converter 26I --, therefor.

Column 6, Lines 35-36, delete "boost converter 241 and power converter 261." and insert -- boost converter 24I and power converter 26I. --, therefor.

Signed and Sealed this
Twenty-sixth Day of November, 2019

Andrei Iancu
*Director of the United States Patent and Trademark Office*